United States Patent [19]

Hishikawa et al.

[11] 4,244,465
[45] Jan. 13, 1981

[54] ELECTROSTATIC HOLDING AND CONVEYING APPARATUS

[75] Inventors: Shintaro Hishikawa; Hideo Yamada, both of Kawaguchi, Japan

[73] Assignee: Taihei Chemicals Limited, Tokyo, Japan

[21] Appl. No.: 30,859

[22] Filed: Apr. 17, 1979

[30] Foreign Application Priority Data

Apr. 21, 1978 [JP] Japan .................................. 53/47486

[51] Int. Cl.³ ............................................ B65G 47/92
[52] U.S. Cl. ..................................... 198/691; 271/193
[58] Field of Search ............... 198/844, 846, 691, 847, 198/502, 856; 271/193, DIG. 3, 18.1, 18.2; 40/472, 524, 594

[56] References Cited

U.S. PATENT DOCUMENTS

| | | | |
|---|---|---|---|
| 2,576,882 | 11/1951 | Koole et al. | 198/691 |
| 3,493,157 | 2/1970 | Burdorf et al. | 198/691 |
| 3,584,733 | 6/1971 | Isermann | 198/691 |
| 3,602,360 | 8/1971 | Halbach et al. | 198/502 |

Primary Examiner—Joseph E. Valenza

Attorney, Agent, or Firm—Kerkam, Stowell, Kondracki & Clarke

[57] ABSTRACT

An electrostatic holding and conveying apparatus having an endless belt member which comprises a base layer of soft, flexible insulative material and two groups of electrodes equally spaced and disposed on a first surface of the base layer. A protective layer of soft flexible semiconductive or insulative material is disposed on the first surface of the base layer to cover the electrodes. Two groups of terminals are provided on a second surface of the base layer and electrically connected to the two groups of electrodes, respectively. The endless belt extends between a drive roller and a driven roller with the second surface of the base layer in contact with the rollers. One of the rollers has two contact rings isolated from each other and supplied with a high DC voltage. The endless belt is driven by the drive roller with at least one terminal of each terminal group in electrical contact with the corresponding contact ring of the one roller so that the endless belt conveys sheet materials while electrostatically holding them.

9 Claims, 5 Drawing Figures

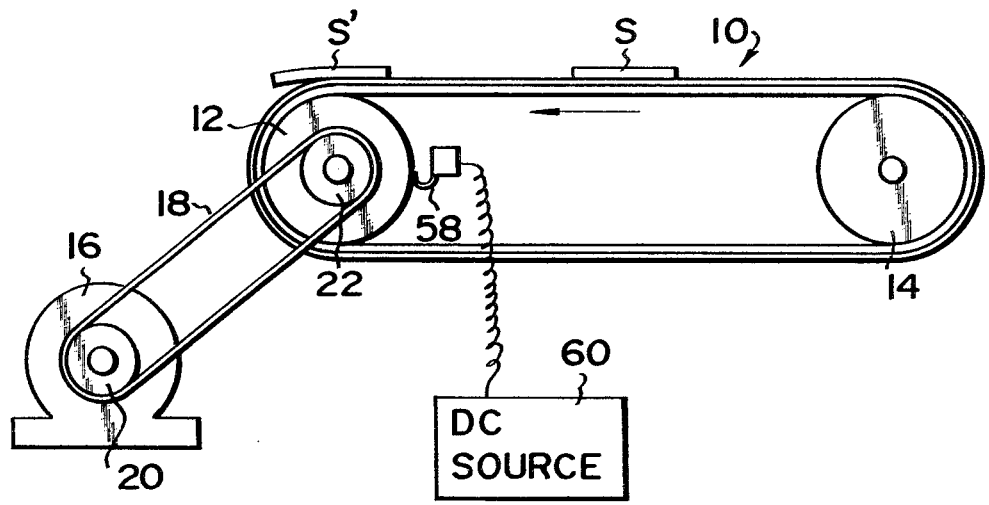
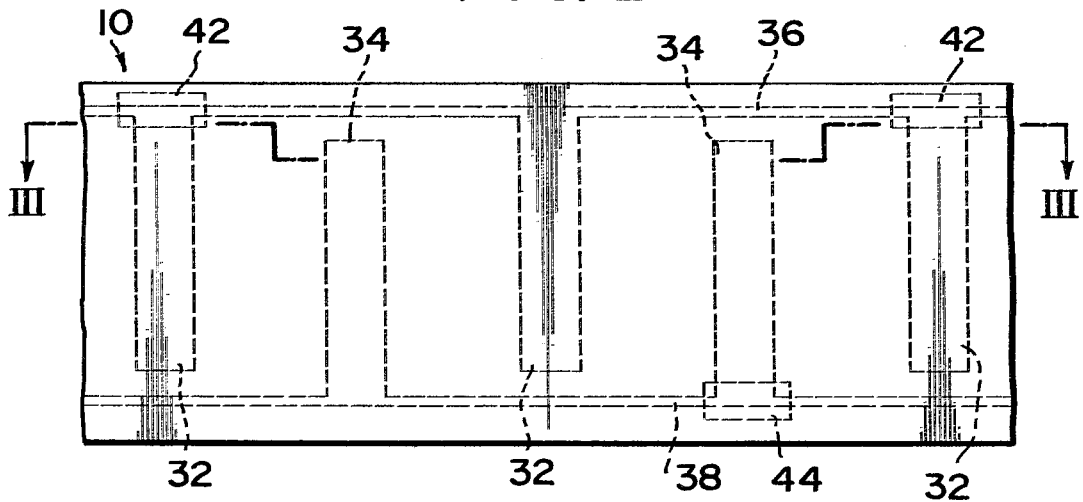
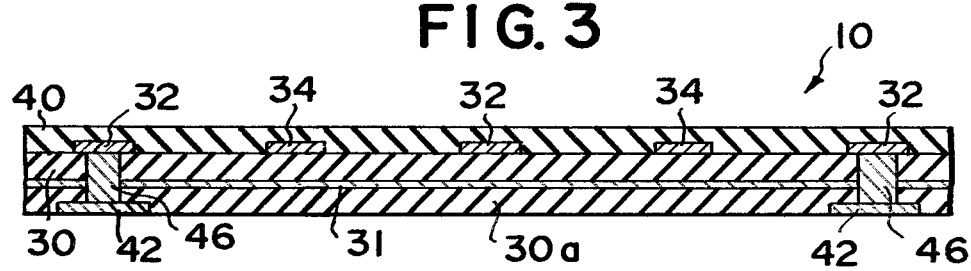

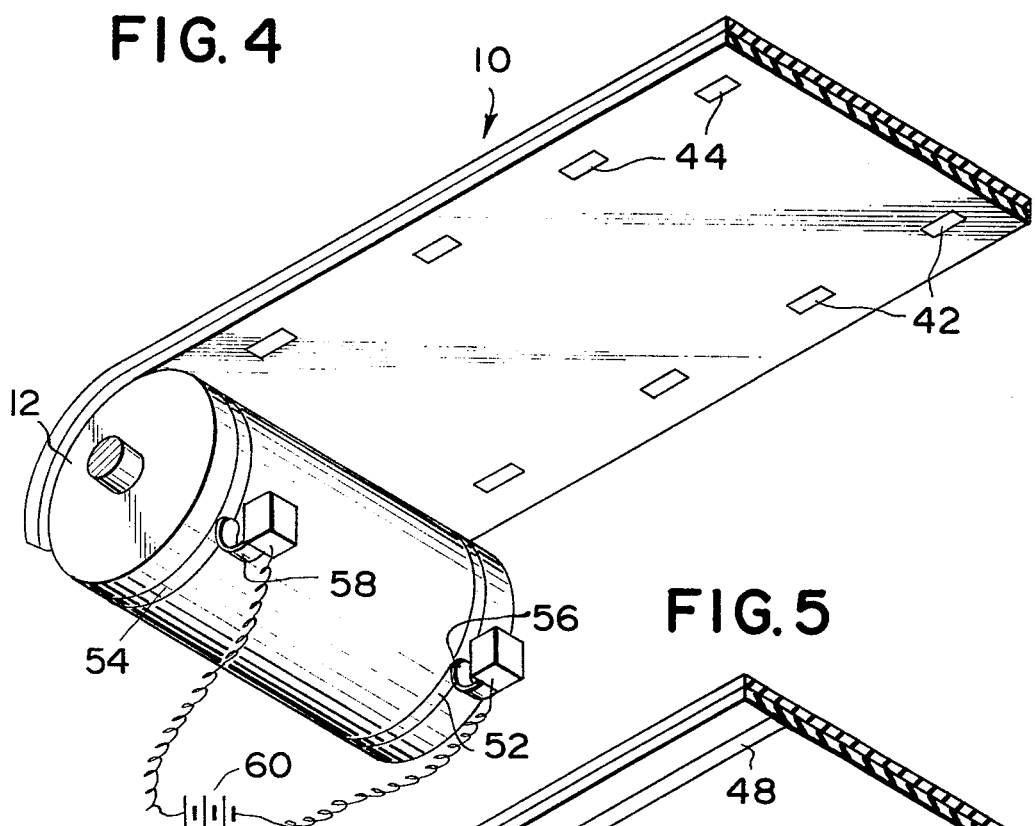
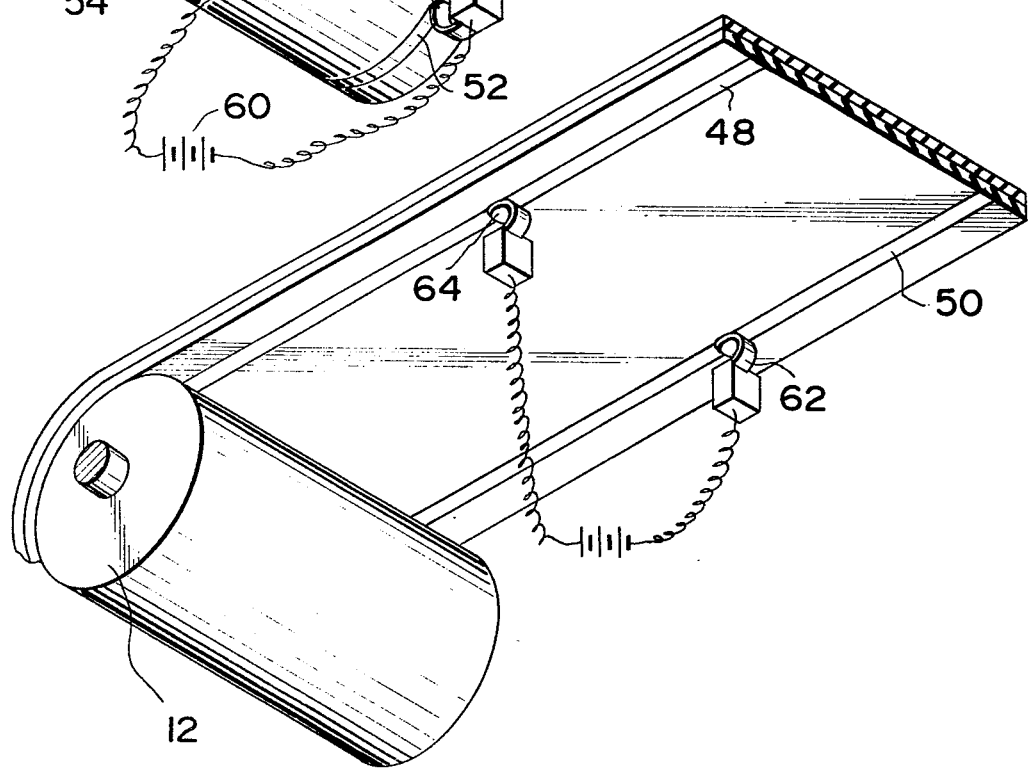

ELECTROSTATIC HOLDING AND CONVEYING APPARATUS

This invention relates to an apparatus for electrostatically holding sheet material, and particularly to an apparatus for conveying a sheet material while holding it electrostatically.

Recently, electrostatic holding apparatuses of various types adapted to attract and hold sheet materials such as papers and films by an electrostatic attracting force have been proposed and practically used for holddown of record papers in XY recorders and for holding sheet materials on bulletin-boards, advertisement-boards, education-boards, etc. All of these electrostatic holding apparatuses are constructed to attract and hold sheet materials in a static condition. For this purpose, the holding apparatus ordinarily has an attracting base in the form of a flat plate, in the form of an arc having a very large radius of curvature, or in the form of a cylinder having a very large radius. The attracting base is composed of a material of poor flexibility such as hard vinyl chloride resin, glass-fiber mixed epoxy resin, etc.

However, although these apparatuses have been satisfactory in their ability to hold sheet materials, they have not been capble of conveying the sheet materials while electrostatically holding them. Because of this, there has been a need for an electrostatic holding and conveying apparatus. However, no practical and satisfactory apparatus for such purpose has yet been proposed.

Accordingly, it is an object of this invention to provide an electrostatic holding and conveying apparatus for conveying sheet materials while electrostatically holding them.

It is another object of this invention to provide such an apparatus of a belt conveyer type.

It is a further object of this invention to provide an attracting member which can be formed as a conveyer belt which cannot avoid being bent at a small radius of curvature around a drive roller of the conveyer.

The above objects are accomplished by an electrostatic holding and conveying apparatus according to one aspect of this invention, which comprises a belt member having a base layer of flexible insulative material, two groups of electrodes spaced and disposed on a first surface of the base layer, a protective layer of flexible material of poor conductivity disposed on the first surface of the base layer to cover the electrodes, and two terminals located on one surface of the belt member and electrically connected to the two groups of the electrodes, respectively. At least one pair of contact members are connected to a high voltage DC source and located to ceaselessly contact with the terminals of the belt member, respectively, when the belt member is driven by suitable driving means, so that the belt member conveys sheet materials while holding them electrostatically.

In one embodiment of the apparatus according to this invention, the belt member is an endless belt extending between a driving roller and a driven roller with the second surface of the base layer of the belt member in contact with these rollers. The endless belt has two groups of terminals provided on the second surface of the base layer of the belt member. The terminals of the two groups are located in two rows along the length of the endless belt. Either the driving roller or the driven roller has a pair of conductive rings disposed thereon to surround the roller and positioned to ceaselessly contact with at least one terminal of the corresponding terminal group of the belt member. A pair of brush members connected to the DC voltage source are located to ceaselessly contact with the respective rings of the roller when the endless belt is driven. Thus, when the endless belt is rotated by the driving roller, the endless belt can convey sheet materials while electrostatically holding them.

According to another aspect of this invention there is provided a conveyer belt member for use in an electrostatic holding and conveying apparatus, which conveyer belt member comprises a base layer of flexible insulative material and two groups of electrodes spaced and disposed on a first surface of the base layer. The conveyer belt member also comprises a protective layer of flexible material of poor conductivity disposed on the first surface of the base layer to cover the electrodes, and two terminals located on a surface of the belt member and electrically connected to the two groups of electrodes, respectively. In one preferred embodiment, the groups of electrodes are interdigitated and equally spaced so as to produce an even electrostatic field over the whole surface of the belt when an electrical potential is applied therebetween. The protective layer is made of soft, flexible semiconductive plastics having resistivity of $10^8$ Ωcm to $10^{12}$ Ωcm and dielectric constant of 4 to 12. In this case, the protective layer can have a substantial thickness of for example 1 mm. If the resistivity of the protective layer is larger than $10^{12}$ Ωcm, the protective layer may catch charges in the air and be easily charged by friction. In addition, residual charges in the protective layer are difficult to disperse after the electrical potential is disconnected. If the protective layer has a resistivity of less than $10^8$ Ωcm, the belt member cannot sufficiently electrostatically attract and hold sheet materials such as paper which has a resistivity of about $10^8$ Ωcm. And, the larger the dielectric constant of the protective layer is, the more the flux appearing outside the protective layer will increase. However, no dielectric material having a dielectric constant of greater than 12 would be commercially available. The protective layer may be overcoated with a very thin coating layer of hard and flexible material such as polyvinyl fluoride. Alternatively, the very thin coating layer of hard and flexible material may be directly coated on the base layer.

The above and other objects and effects of this invention will become apparent from the following detailed description of embodiments of this invention with reference to the accompanying drawing, in which:

FIG. 1 is a side view of one embodiment of an electrostatic holding and conveying apparatus according to this invention;

FIG. 2 is a partial plan view of the conveyor belt member used in the electrostatic holding and conveying apparatus shown in FIG. 1;

FIG. 3 is a sectional view taken along the line III—III in FIG. 2;

FIG. 4 is a partial perspective view of the electrostatic holding and conveying apparatus in FIG. 1; and FIG. 5 is a view similar to FIG. 4 but showing another embodiment of this invention.

Referring to FIG. 1, there is shown one embodiment of an electrostatic holding and conveying apparatus according to this invention. The apparatus comprises an endless belt member 10 extending between two rollers 12 and 14 which are rotatably supported by suitable bearing means (not shown). The roller 12 is driven by driving means such as an electric motor 16 through a belt 18 which extends between a pulley 20 coupled to a rotating shaft of the motor and a pulley 22 coupled to the roller 12. Therefore, the roller 12 acts as a driving roller for the endless belt 10 and the roller 14 acts as a driven roller, so that the endless belt 10 acts as a belt conveyer.

Referring to FIGS. 2 and 3, the endless belt 10 has a base layer 30 of a soft, flexible insulative material. This material may be thermoplastics such as soft polyvinyl chrolide or polyolefin such as polyethylene or polypropylene, containing 40 weight % of dibutyl phthalate as a plasticizer; natural rubber; synthetic rubber; etc. For the purpose of giving the conveyor belt 10 sufficient toughness, the base layer 30 may be backed with a reinforcing cloth 31 made of cotton fiber or any of various synthetic fiber. The reinforcing cloth 31 is also backed with a layer 30a made of the same material as that of the base layer 30. In this case, the base layer 30, the reinforcing cloth 31 and the backing layer 30a are made integral by, for example, adhesive-bonding or thermocompression-bonding.

Two groups of electrodes 32 and 34 are disposed on a first surface of the base layer 30 and are interdigitated and equally spaced, as shown by the dotted lines in FIG. 2, to produce an even electrostatic field over the surface of the belt when an electrical potential is applied therebetween. The electrodes of each group are interconnected by leads 36 and 38 which are also disposed on the first surface of the base layer 30 to straightly extend along and adjacent to opposite edges of the belt, as shown by the dotted lines in FIG. 2. These electrodes 32 and 34 and leads 36 and 38 are formed of conductive plastics disposed on the base layer 30, for example, by printing of conductive ink, or compression-bonding or thermocompression-bonding of a conductive tape. However, the electrodes and the leads may be metal deposited on the base layer for example by vacuum-metallizing.

A protective layer 40 of soft, flexible insulative or semiconductive material is disposed on the first surface of the base layer 30 to cover the electrodes 32 and 34 and the leads 36 and 38. This material should preferably have a resistivity of $10^8$ $\Omega$cm to $10^{12}$ $\Omega$cm and a dielectric constant of 4 to 12. The following is a composition table showing one example of a semiconductive thermoplastics having the resistivity and the dielectric constant of the above ranges:

| | |
|---|---|
| nitrile-butadiene rubber | 35 parts |
| polyvinyl chloride | 15 parts |
| methyl methacrylate resin | 50 parts |
| carbon black | 10 parts |
| stabilizer | 2 parts |
| lubricant | 1.5 parts |
| plasticizer | 1.5 parts |
| age-resister | 0.5 parts |

If the protective layer is made from a semiconductive thermoplastics having the above mentioned properties, it can be made in a thickness, for example of 1 mm, sufficient to prevent formation of pin holes without decreasing an electrostatic attracting force appearing outside the protective layer.

Insulative plastics having a dielectric constant of 4 or more include polyvinyl fluoride, cellulose acetate, etc. If desired, the protective layer of semiconductive thermoplastics may be overcoated by a very thin layer of polyvinyl fluoride. The protective layer 40 is bonded onto the base layer, for example, by adhesive-bonding or thermocompression-bonding.

The belt 10 has two groups of terminals 42 and 44 disposed on a second surface of the base layer, namely, the back surface of the belt. The terminals of each group are located in a straight line along the length of the belt at equal intervals which are shorter than half of the peripheral length of the roller 12. Each terminal of each group is positioned in registration with the corresponding lead and is electrically connected with the corresponding lead through a conductive region 46 formed in the base layer between the terminal and the corresponding lead.

Instead of the two groups of terminals 42 and 44, two continuous conductive regions 48 and 50 may be provided on the back surface of the belt in registration with the leads 36 and 38.

The terminals 42 and 44 and the conductive regions 48 and 50 are formed for example by applying conductive plastics such as conductive paint and conductive adhesive, by attaching metal layers with conductive adhesive or by vacuum-metallizing.

The endless of belt 10 is formed, for example, in the following manner. First, the base layer 30 is perforated to have through holes in locations on which the conductive regions 46 are to be formed. The through holes are then filled with conductive plastics to form the conductive regions 46. Next, the electrodes 32 and 34 and the leads 36 and 38 are formed on a first surface of the base layer 30 with the leads in registration with the conductive regions, for example, by printing of the electrode and lead pattern using conductive ink, by compression-bonding or thermocompression-bonding of conductive tapes, or by vacuum metallizing. Thereafter, the protective layer 40 is disposed on the first surface of the base layer 30 to cover all the electrodes and the leads, and then is hot-pressed or thermocompressed on the base layer. The conductive regions exposing on the second surface of the base layer, namely, the back surface of the belt will form the terminals 42 and 44. Alternatively, the terminals 42 and 44 or the conductive regions 48 and 50 are disposed on the second surface of the base layer by printing of conductive ink. And, the belt member so formed is bonded at opposite ends thereof to form the endless belt, for example, by adhesive-bonding, thermocompression-bonding, seaming, clip-coupling, etc.

One of the rollers 12 and 14, for example, the roller 12 in the shown embodiment, has a pair of conductive rings disposed thereon to surround the roller 12 spaced from each other by the same distance as the lateral distance between the two terminal groups on the belt 10. The conductive rings are made of metal. But, the rings may be made of conductive tape which is compression-bonded or thermocompression-bonded on the cylindrical surface of the roller. Furthermore, a pair of brush members 56 and 58 are connected to a suitable high voltage DC source 60 and supported by suitable supporting means (not shown) to ceaselessly contact with the corresponding conductive rings 52 and 54 of the roller 12 when the roller 12 is rotated. And, the endless belt 10 is wound around the rollers 12 and 14 with the two terminal groups in registration with the conductive rings so that a high DC voltage is applied between the groups of electrodes through the brush member 56 and 58, the conductive rings 52 and 54, the terminals 42 and 44, the conductive regions 46, and the leads 36 and 38.

The above mentioned electrostatic holding and conveying apparatus of the belt conveyer type operates as follows: The endless belt 10 is moved for example in the direction of the arrow in FIG. 1 when the driving means 16 is energized. When the endless belt 10 is moving in the direction of the arrow, at least one of the terminals of each group is in contact with the corresponding ring 52 or 54 on the roller 12 so that the high DC voltage is ceaselessly applied between the two groups of electrodes. As a result, an even electrostatic field is created over substantially the whole surface of the protective layer of the endless belt during the movement of the endless belt.

Therefore, if a sheet material S is put on the outer surface of the endless belt, the sheet material S has electrostatically induced charges of an opposite polarity to that of the electrodes at areas facing the electrodes. As a result, an electrostatic attracting force is generated between the electrodes and the induced charges on the sheet material S, whereby the sheet material S is electrostatically held on the surface of the protective layer of the belt 10 and conveyed by the endless belt in the direction of the arrow by movement of the endless belt. When the sheet material reaches the position of the roller 12, namely, a portion where the endless belt is sharply bent, the sheet material will be returned to the tangent plane to the roller as shown by the sheet S' and will spontaneously separate from the endless belt because of the natural resiliency of the sheet material per se. As a result, the sheet material is fed off the belt to a predetermined position.

In order to facilitate the separation of the sheet material, the voltage applied between the electrodes is selected to adjust the electrostatic attracting force in accordance with the resiliency of the sheet material. Alternatively, a puff of air or well-known mechanical stripping means such as a stripping finger can be used to separate the sheet material from the endless belt. In this case, the sheet material can be stripped even from a flat portion of the endless belt.

In the case of the endless belt 10 having the two continuous conductive regions 48 and 50, the DC voltage may be applied either through the conductive rings 52 and 54 or through a pair of brush members 62 and 64 which are located to directly contact with the conductive regions 48 and 50 as shown in FIG. 5.

If the protective layer 40 has a very large electrostatic capacity so that the electrostatic attracting force is not immediately lost after application of the voltage is disconnected, the interval between adjacent terminals along the length of the belt may be somewhat longer than half of the peripheral length of the roller so that the voltage is intermittently applied. Furthermore, the terminals 42 and 44 may be provided on the protective layer of the belt member.

As seen from the above, the apparatus according to this invention can convey sheet materials while electrostatically holding them. Since the belt is constructed to have sufficient flexibility, the belt can be acutely bent so that no limitation is imposed on the design of the belt conveyor of the electrostatic holding and conveying apparatus. Therefore, the electrostatic holding and conveying apparatus according to this invention can be used for feeding originals such as documents and printed matters in a copying machine. If the apparatus is incorporated in a photomechanical processing apparatus, a recorder, etc., sheet feeding can be reliably performed. In addition, the apparatus can be used as a feeding apparatus for feeding clinical charts in a hospital, manuscripts in a publishing house, slips in an office, etc. It will be noted from the above that the apparatus according to this invention is very advantageous.

The present invention has been shown and described with reference to specific embodiments. However, it should be noted that the invention is in no way limited to the details of the illustrated structures but changes and modifications may be made within the scope of the appended claims.

We claim:

1. An electrostatic holding and conveying apparatus comprising a pair of rollers having at least one driving roller; an endless conveyer belt extending between said pair of rollers for conveying a sheet-like material thereon by holding it from one side only of said material in contact with the endless conveyer belt, said endless conveyer belt having a base layer of flexible insulative material, two groups of electrodes spaced and disposed on a first surface of said base layer in such a manner that each two adjacent electrodes are positionally separated and electrically insulated from each other and belong to different groups, respectively, a protective layer of flexible material of poor conductivity disposed on the whole of said first surface of said base layer to cover all of said electrodes, and at least two terminals located on one surface of said conveyor belt and electrically connected to said two groups of electrodes, respectively; and at least one pair of contact members connected across a high voltage DC source and located to continuously contact said terminals of said conveyer belt, respectively, for applying a high voltage between said two groups of electrodes, thereby establishing an electrostatic flux appearing outside said protective layer of said conveyer belt so that the sheet-like material on the surface of said protective layer of said conveyer belt is electrostatically attracted to and held by the conveyer belt by the action of an electrostatic bonding force between an electrical charge in each electrode and an electrical charge of an opposite polarity induced in the sheet-like material, whereby, when said conveyer belt is driven, the sheet-like material is fed together with said conveyer belt.

2. An apparatus set forth in claim 1 wherein said two terminals of said belt member are two groups of terminals located in two rows at a substantially equal interval along the full length of said endless belt member and wherein at least one of said rollers has a pair of conductive rings disposed thereon to surround the one roller and spaced and located in registration and contact with the respective groups of terminals on said endless belt member, said pair of rings being in contact with a pair of brush members connected to said DC voltage source.

3. An apparatus set forth in claim 1 wherein said two terminals of said belt member are two continuous conductive regions formed apart from each other and extending along the full length of said endless belt member and wherein at least one pair of brush member connected to said DC voltage source are located to contact with said continuous conductive regions of said endless belt member.

4. A conveyer belt set forth in claim 1 wherein said protective layer is made of a soft, flexible semiconductive thermoplastics having a resistivity of $10^8$ Ωcm to $10^{12}$ Ωcm and a dielectric constant of 4 to 12.

5. A conveyer belt set forth in claim 1 wherein said protective layer is made of flexible insulative plastics having a dielectric constant of 4 or more.

6. A conveyer belt set forth in claim 1, 4 or 5 wherein said base layer includes a first and second layers of soft flexible insulative material and a reinforcing cloth interposed between and bonded to said first and second layers.

7. A conveyer belt set forth in claim 1, 4 or 5 wherein said two groups of electrodes are interdigitated in such a manner that one electrode of one group is interposed between two adjacent electrodes of the other group.

8. A conveyer belt set forth in claim 1 wherein said electrodes are made of conductive paint.

9. A conveyer belt set forth in claim 1 wherein said electrodes are made of conductive pressure-sensitive adhesive.

* * * * *